US012669231B2

(12) United States Patent
Park et al.

(10) Patent No.: US 12,669,231 B2
(45) Date of Patent: *Jun. 30, 2026

(54) DEHUMIDIFIER OF LAMP FOR VEHICLE AND LAMP INCLUDING THE SAME

(71) Applicants: Hyundai Motor Company, Seoul (KR); Kia Corporation, Seoul (KR); HVS, Suwon-si (KR)

(72) Inventors: Yoonsang Park, Gimcheon-si (KR); Jae Deok Kim, Yongin-si (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 19/237,190

(22) Filed: Jun. 13, 2025

(65) Prior Publication Data

US 2026/0139811 A1 May 21, 2026

(30) Foreign Application Priority Data

Nov. 20, 2024 (KR) ........................ 10-2024-0166487

(51) Int. Cl.

*F21S 45/30* (2018.01)
*F21S 45/10* (2018.01)
*F21S 45/20* (2018.01)
*F21S 45/50* (2018.01)

(52) U.S. Cl.

CPC ............... *F21S 45/30* (2018.01); *F21S 45/10* (2018.01); *F21S 45/20* (2018.01); *F21S 45/50* (2018.01)

(58) Field of Classification Search

None

See application file for complete search history.

(56) References Cited

U.S. PATENT DOCUMENTS

| | | | | |
|---|---|---|---|---|
| 6,422,729 | B1 | 7/2002 | Rohrbach | |
| 11,137,130 | B1 | 10/2021 | Dry et al. | |
| 2003/0133310 | A1* | 7/2003 | VanDuyn ................ | F21S 45/33 362/547 |
| 2003/0230460 | A1 | 12/2003 | Usui | |
| 2005/0157514 | A1* | 7/2005 | Brinkmann ............. | F21S 45/33 362/547 |

(Continued)

FOREIGN PATENT DOCUMENTS

| | | | |
|---|---|---|---|
| CN | 110307521 | A | 10/2019 |
| CN | 112367821 | A | 2/2021 |

(Continued)

OTHER PUBLICATIONS

Hyundai Motor Company et al., "European Search Report", EP Application No. 25185585.4, dated Nov. 26, 2025, 8 pages.

*Primary Examiner* — Christopher E Dunay

(74) *Attorney, Agent, or Firm* — Slater Matsil, LLP

(57) ABSTRACT

A dehumidifier, and a lamp for a vehicle including the same, can include a dust cover including a first communicate hole therein, a moisture absorption cover disposed in the dust cover, in which a desiccant that absorbs a moisture included in the air can be accommodated, and in which a second communicate hole corresponding to the first communicate hole is formed, and a valve including a shape memory allow such that the valve is configured to selectively open the first communicate hole and the second communicate hole by the shape memory alloy being deformed by a temperature change.

17 Claims, 13 Drawing Sheets

(56) References Cited

U.S. PATENT DOCUMENTS

| | | | | |
|---|---|---|---|---|
| 2018/0142857 | A1* | 5/2018 | Park | F21S 45/33 |
| 2018/0328580 | A1* | 11/2018 | Tezuka | F21S 45/10 |
| 2019/0120456 | A1* | 4/2019 | Noda | F21S 41/28 |
| 2019/0271449 | A1 | 9/2019 | Helwig et al. | |
| 2019/0299152 | A1 | 10/2019 | Alexander et al. | |
| 2020/0300439 | A1* | 9/2020 | Chen | F21S 45/60 |
| 2022/0042668 | A1 | 2/2022 | Menn | |
| 2025/0102130 | A1* | 3/2025 | Koulouh | F21S 45/60 |

FOREIGN PATENT DOCUMENTS

| | | | |
|---|---|---|---|
| CN | 118475791 | A | 1/2023 |
| EP | 1818609 | A2 | 8/2007 |
| JP | 2014089928 | A | 5/2014 |
| JP | 2023057651 | A | 4/2023 |
| KR | 20240042911 | A | 4/2024 |

* cited by examiner

DEHUMIDIFIER OF LAMP FOR VEHICLE AND LAMP INCLUDING THE SAME

CROSS-REFERENCE TO RELATED APPLICATIONS

This application claims priority to and the benefit of Korean Patent Application No. 10-2024-0166487 filed with the Korean Intellectual Property Office on Nov. 20, 2024, the entire contents of which are incorporated herein by reference.

TECHNICAL FIELD

The present disclosure relates to a dehumidifier of a lamp for a vehicle and a lamp including the same.

BACKGROUND

In general, vehicles are equipped with various types of lamps that perform a lighting function to easily check positions of objects in a vicinity when driving at night and a signal function to inform the running state vehicle to other vehicles and road users.

For example, lamps that perform the lighting functions include head lamps and fog lamps, and lamps that perform the signal functions include turn signal lamps, tail lamps, and brake lamps.

In these lamps for the vehicle, the temperature inside the lamp changes as the light source module inside turns on or off. That is, as the temperature rises when the light source module is turned on, the air inside the lamp expands and the air is discharged to the outside through a vent hole provided in the lamp. Conversely, when the light source module is turned off and the air inside the lamp contracts, an external air flows into the inside of the lamp through the vent hole. Accordingly, when the external air flows into the interior of the lamp, the moisture included in the air also flows into the interior of the lamp.

However, because the lamp is exposed to the outside of the vehicle, if the vehicle is washed after the driving or left in an environment with low external temperature for a long time, the temperature of the lamp may drop below a dew point, which may cause a condensation inside the lamp, resulting in a failure of the light source module of the lamp, or the deterioration of the function of the lamp.

To solve this problem, a desiccant is applied to the lamp, but if the desiccant absorbs a moisture, it may expand, causing an interference with other parts and reducing the durability of the desiccant.

The above information disclosed in this Background section is only for enhancement of understanding of the background of the present disclosure and therefore it may contain information that does not form the prior art that is already publicly known, available, or in use.

SUMMARY

The present disclosure relates to a dehumidifier of a lamp for a vehicle and a lamp including the same, and more particularly, the present disclosure relates to a dehumidifier for a lamp of a vehicle, which may improve the durability of the lamp by efficiently controlling the humidity inside the lamp for the vehicle, thereby preventing a condensation of the lamp due to a moisture, and preventing a damage to an electronic device due to moisture.

In an embodiment of the present disclosure, a task to be solved can be to provide a dehumidifier of a lamp for a vehicle and a lamp including the same, which may improve a performance of a desiccant.

A dehumidifier of a lamp for a vehicle according to an embodiment of the present disclosure may include a dust cover where a first communicate hole is formed; a moisture absorption cover provided in the dust cover, in which a desiccant that absorbs a moisture included in the air is accommodated, and in which a second communicate hole corresponding to the first communicate hole is formed; and a valve that selectively opens the first communicate hole and the second communicate hole by a shape memory alloy that is deformed by a temperature difference.

In some embodiments, the valve may include an opening/closing plate formed of a shape memory alloy and selectively opening the first communicate hole and the second communicate hole according to a temperature change.

In some embodiments, the valve may include: a magnetic plate formed of a magnetic material and provided in one of the first communicate hole and the second communicate hole; and a supporting plate which is coupled to the opening/closing plate, is deformed depending on to the deformation of the opening/closing plate, and is selectively attached to the supporting plate.

In some embodiments, the magnetic plate may be formed with a shape corresponding to the periphery of the first communicate hole and the second communicate hole.

In some embodiments, the magnetic plate may be fixedly installed in either the first communicate hole of the dust cover or the second communicate hole of the moisture absorption cover.

In some embodiments, the supporting plate may be formed of an iron sheet.

In some embodiments, the supporting plate may be opened in the center and be formed in a shape corresponding to the outer periphery of the opening/closing plate.

In some embodiments, a membrane provided in the first communicate hole and preventing moisture outside the dust cover from flowing in may be further included.

In some embodiments, a sealing pad provided on the outside of the supporting plate may be further included.

In some embodiments, a gasket provided between the dust cover and the moisture absorption cover may be further included.

In some embodiments, when the surrounding temperature of the valve is below a set, selected, or predetermined temperature, the opening/closing plate of the valve may be deformed in a first shape, and the opening/closing plate may block the first communicate hole and open the second communicate hole.

In some embodiments, when the surrounding temperature of the valve is higher than the set, selected, or predetermined temperature, the opening/closing plate of the valve may be deformed into a second shape, and the opening/closing plate may open the first communicate hole and block the second communicate hole.

A dehumidifier of a lamp for a vehicle according to an embodiment of the present disclosure may include: a dust cover including a dust supporting bracket having a cross-section formed in an arc shape, and a first communicate hole formed in the dust supporting bracket; a moisture absorption cover including a moisture absorption supporting bracket having a cross-section formed in a shape of an arc, and a second communicate hole formed in the moisture absorption supporting bracket and corresponding to the first communicate hole; and a valve provided between the dust supporting bracket and the moisture absorption supporting bracket, and selectively opening the first communicate hole and the second communicate hole by a shape memory alloy deformed by a temperature difference.

In the dehumidifier of the lamp for the vehicle, the valve may include: an opening/closing plate formed of a shape memory alloy and selectively opening the first communicate hole and the second communicate hole according to a temperature change; a magnetic plate formed of a magnetic material and provided in one of the first communicate hole and the second communicate hole; a supporting plate coupled to the opening/closing plate, deformed according to the deformation of the opening/closing plate, and selectively attached to the supporting plate; and a sealing pad provided on the outside of the supporting plate.

The dehumidifier of the lamp for the vehicle may further include: a supporting protrusion formed in one of the dust cover or the moisture absorption cover; and a supporting groove formed on the other of the dust cover or the moisture absorption cover to be fixed to the supporting protrusion and into which the supporting protrusion is inserted.

In the dehumidifier of the lamp for the vehicle, the opening/closing plate may have an opening/closing auxiliary supporting hole formed corresponding to the supporting protrusion, and the sealing pad may have a sealing auxiliary supporting hole corresponding to the supporting protrusion.

In the dehumidifier of the lamp for the vehicle, when the surrounding temperature of the valve is below a set, selected, or predetermined temperature, the opening/closing plate of the valve may be deformed in a first shape, and the opening/closing plate may block the first communicate hole and open the second communicate hole.

In the dehumidifier of the lamp for the vehicle, when the surrounding temperature of the valve is higher than a set, selected, or predetermined temperature, the opening/closing plate of the valve may be deformed into a second shape, the opening/closing plate may open the first communication hole and block the second communication hole.

The dehumidifier of the lamp for the vehicle may further include a membrane provided in the first communicate hole to prevent moisture outside the dust cover from flowing in.

A lamp for a vehicle according to an embodiment of the present disclosure may include the dehumidifier described above.

According to an embodiment of the present disclosure, when the vehicle is parked, a moist air from the outside may be prevented from flowing into the interior of the dehumidifier and the lamp, thereby preventing the deterioration of the performance of the desiccant.

According to an embodiment of the present disclosure, by discharging the moist air absorbed by the desiccant to the outside of the dehumidifier while the vehicle is running, the performance of the desiccant may be improved.

Advantages that can be obtained or expected from example embodiments of the present disclosure are directly or suggestively described in the following detailed description. That is, various advantages expected from example embodiments of the present disclosure will be described in the following detailed description.

BRIEF DESCRIPTION OF THE DRAWINGS

The drawings are provided for reference to explain an illustrative example embodiment of the present disclosure, and the technical spirit of the present disclosure should not be interpreted to be necessarily limited to the accompanying drawings.

Figure 1:
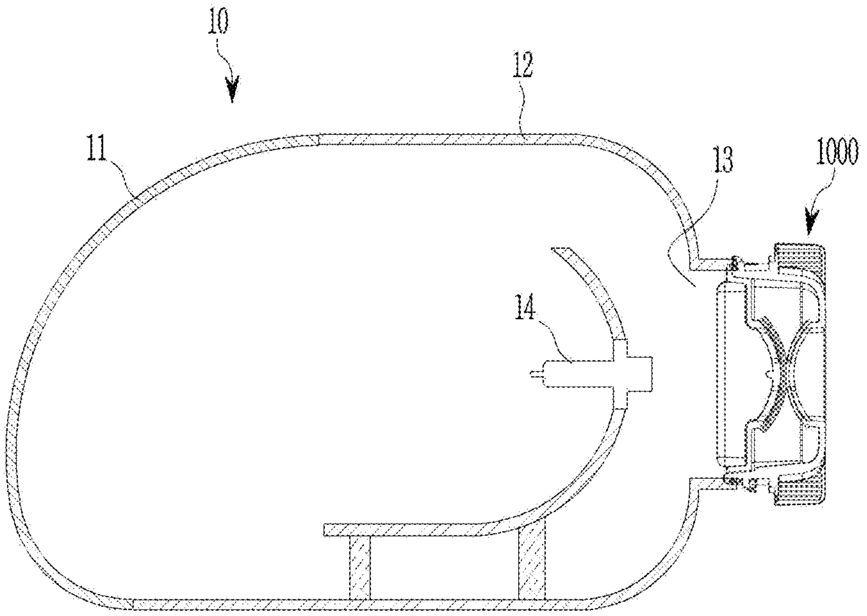
FIG. 1 is a cross-sectional view illustrating a configuration of a lamp for a vehicle according to an example embodiment of the present disclosure.

It can be understood that the above-referenced drawings are not necessarily to scale, and can be presenting a somewhat simplified representation of various features illustrative of some principles of an example embodiment of the present disclosure. The specific design features of an example embodiment of the present disclosure, including, for example, specific dimensions, orientations, locations, and shapes, can be determined in part by a particular intended application and use environment, for example.

DETAILED DESCRIPTION OF ILLUSTRATIVE EMBODIMENTS

Terminology used herein is for the purpose of describing particular example embodiments, and is not intended to necessarily limit the present disclosure. As used herein, singular forms can be intended to also include a plurality of forms, unless the context clearly indicates otherwise. It can be understood that the terms “comprises” or “have” used in the present specification specify the presence of stated features, numerals, steps, operations, components, parts, or a combination thereof, but does not preclude the presence or addition of one or more other features, numerals, steps, operations, components, parts, or a combination thereof. Also, as used herein, the term “and/or” includes any plurality of combinations of items or any of a plurality of listed items.

The present disclosure will be described more fully hereinafter with reference to the accompanying drawings, in which example embodiments of the disclosure are shown. As those skilled in the art can realize, the described embodiments may be modified in various different ways, all without departing from the spirit or scopes of the present disclosure.

To clearly explain the present disclosure, parts that are not related to the explanation can be omitted. Like reference numerals can designate like elements throughout the specification.

Further, because the sizes and thicknesses of constituent members shown in the accompanying drawings can be arbitrarily given for better understanding and ease of description, the present disclosure is not necessarily limited to the illustrated sizes and thicknesses, and the thicknesses can be shown enlarged to clearly express various parts and regions.

In describing example embodiments of the present specification, when it is determined that a detailed description of the well-known art associated with the present disclosure may obscure the gist of the present disclosure, it can be omitted.

The accompanying drawings are provided to allow example embodiments disclosed in the present specification to be easily understood and are not to be interpreted as necessarily limiting the spirit disclosed in the present disclosure, and it can be understood that the present disclosure can include all modifications, equivalents, and substitutions without departing from the scopes and spirit of the present disclosure.

Terms including ordinal numbers such as “first,” “second,” and the like, can be used merely to describe various components, and are not necessarily limiting these components. The terms can be used merely to differentiate one component from other components.

In the description, expressions described in the singular in this specification may be interpreted as the singular or plural, unless an explicit expression such as “one” or “single” is used.

Hereinafter, a dehumidifier for a lamp for a vehicle according to an embodiment of the present disclosure is described in detail with reference to attached drawings.

FIG. 1 is a cross-sectional view illustrating a configuration of a lamp for a vehicle according to an example embodiment of the present disclosure.

The dehumidifier of the lamp for the vehicle according to an embodiment of the present disclosure, as shown in FIG. 1, may be installed in a lamp 10 provided in the vehicle.

The lamp 10 for the vehicle may include a lens 11, a housing 12, a light source module 14, and a dehumidifier 1000.

The lens 11 may be coupled to housing 12 and emit a light from light source module 14 to the outside. The lens 11 and the housing 12 may be combined to form the overall appearance of the lamp 10 for the vehicle, and the light source module 14 may be installed inside the appearance formed by the combination of the lens 11 and the housing 12.

A light source insertion hole 13 into which the light source module 14 may be inserted may be formed in the housing 12, and, if necessary, the light source module 14 may be replaced through the light source insertion hole 13.

The light source module 14 irradiates light, and the light irradiated from the light source module 14 may be emitted to the outside of the lamp 10 through the lens 11.

The dehumidifier 1000 may be provided in the light source insertion hole 13, and the dehumidifier 1000 may be coupled to the light source insertion hole 13 such that the light source insertion hole 13 may be blocked. However, the method of combining the dehumidifier 1000 according to an embodiment is not necessarily limited thereto.

Next, the dehumidifier of the lamp for the vehicle according to an embodiment of the present disclosure will be described in detail with reference to attached drawings.

Figure 2:
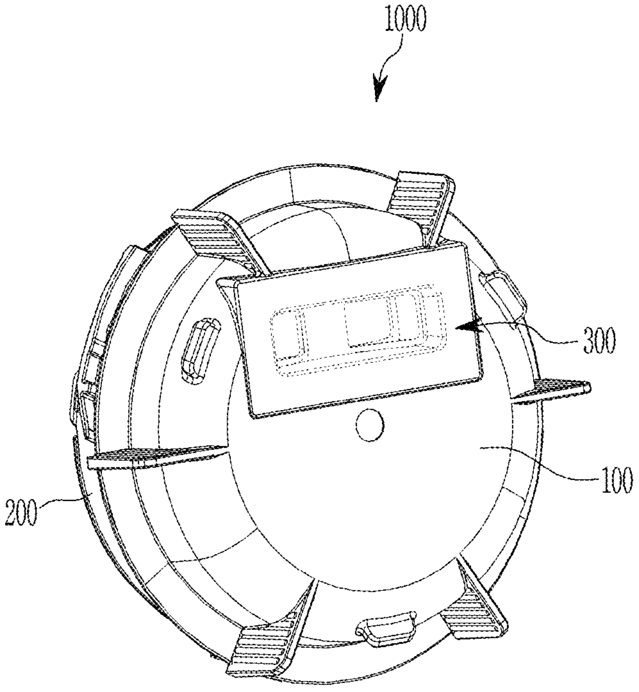
FIG. 2 and FIG. 3 are perspective views illustrating a configuration of a dehumidifier of a lamp for a vehicle according to an example embodiment of the present disclosure.
Figure 3:
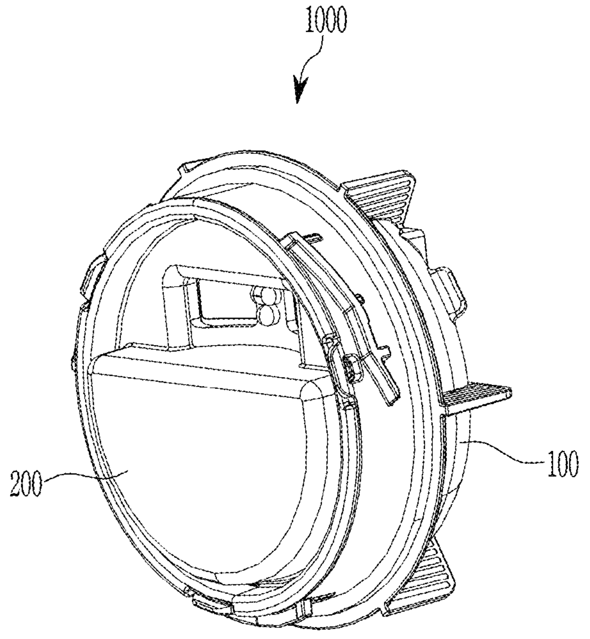
Figure 4:
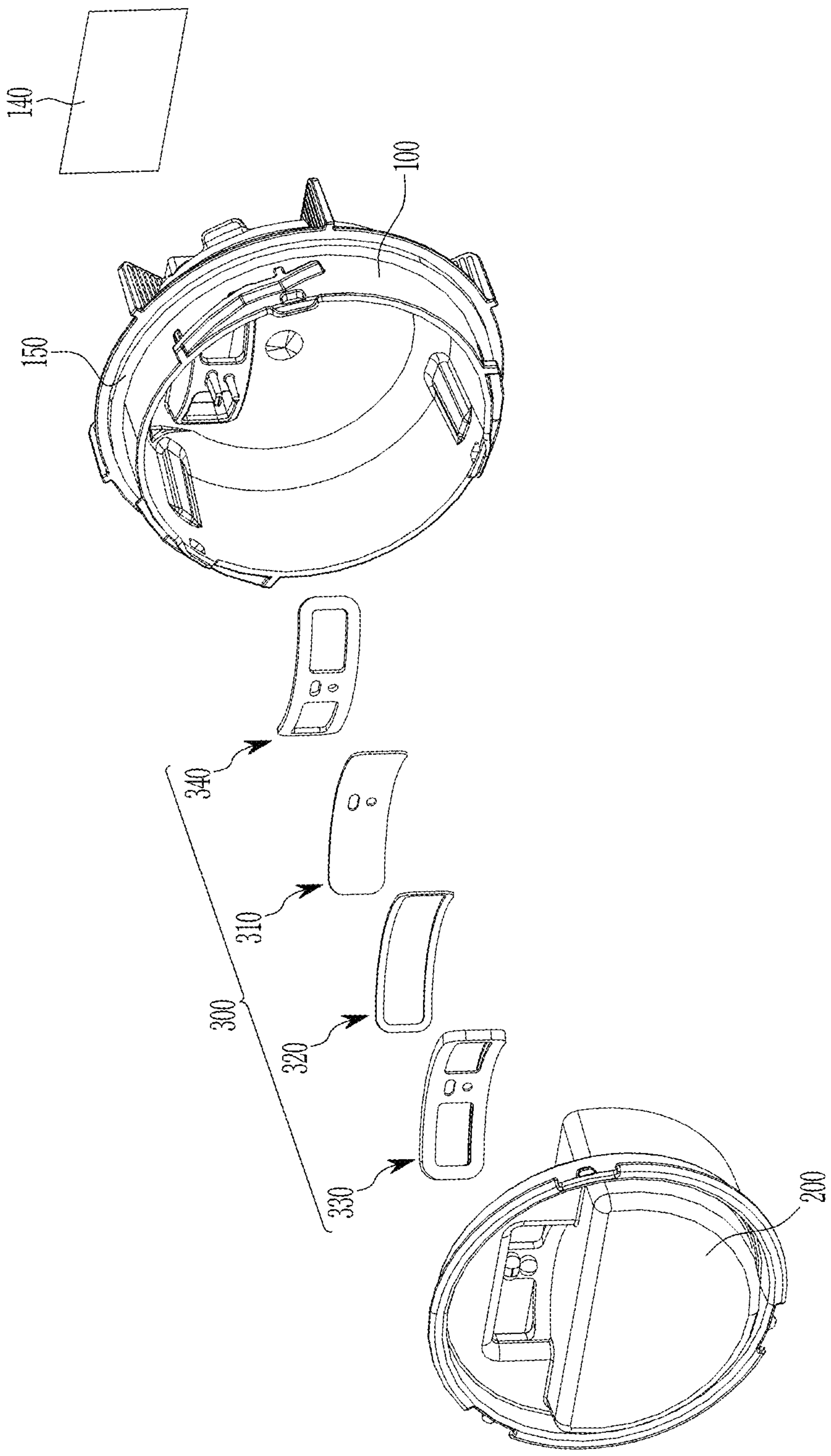
FIG. 4 is an exploded perspective view illustrating a configuration of a dehumidifier of a lamp for a vehicle according to an example embodiment of the present disclosure.

FIG. 2 and FIG. 3 are perspective views illustrating a configuration of a dehumidifier of a lamp for a vehicle according to an example embodiment of the present disclosure. FIG. 4 is an exploded perspective view showing a configuration of a dehumidifier of a lamp for a vehicle according to an example embodiment of the present disclosure.

The dehumidifier of the lamp for the vehicle according to an embodiment of the present disclosure, as shown in FIG. 2 to FIG. 6, may include a dust cover 100 in which a first communicate hole 120 is formed, a moisture absorption cover 200 in which a second communicate hole 220 corresponding to the first communicate hole 120 is formed, and a valve 300 for selectively opening the first communicate hole 120 and the second communicate hole 220.

The dust cover 100 may be provided in the light source insertion hole 13 of the lamp 10 for the vehicle, and a receiving space may be formed inside. The dust cover 100 may be formed into a concave cup or a container shape with an opening in the direction toward the housing 12 and the lens 11.

The receiving space may be closed and sealed by combining the dust cover 100 and the moisture absorption cover 200. For this purpose, a gasket 150 may be provided on the outside of the dust cover 100 and the outside of the moisture absorption cover 200.

Figure 5:
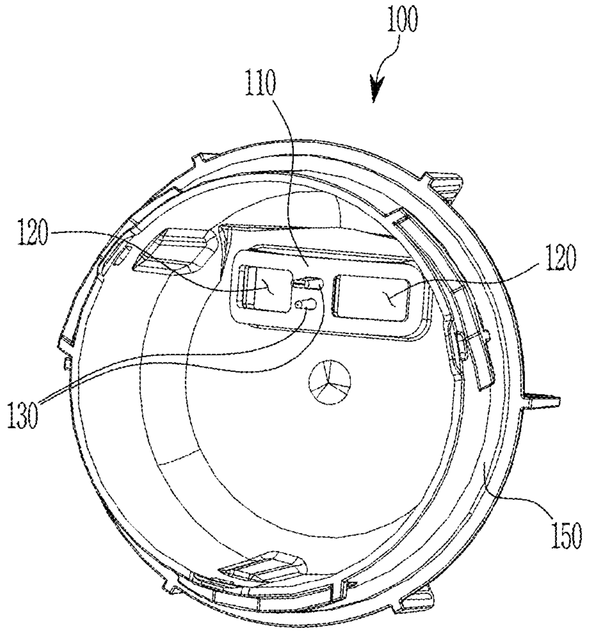
FIG. 5 is a perspective view showing a configuration of a dust cover of a dehumidifier according to an example embodiment of the present disclosure.

Referring to FIG. 5, the first communicate hole 120 formed in the dust cover 100 may be formed by penetrating the interior and exterior of the dust cover 100. The first communicate hole 120 formed in the dust cover 100 may be formed in a pair. On the inner surface of the dust cover 100, a dust supporting bracket 110 that protrudes toward the inner space of the lamp 10 (or, moisture absorption cover 200) and has an arc-shaped cross-section may be formed, and a first communicate hole 120 may be formed in the dust supporting bracket 110. At least one supporting protrusion 130 may be formed in the center of the dust supporting bracket 110. The pair of first communicate holes 120 may be formed on both sides of the supporting protrusion 130 of the dust supporting bracket 110.

The dehumidifier of the lamp for the vehicle according to an embodiment of the present disclosure may include a membrane 140 that is provided in the first communicate hole 120 and blocks moisture from flowing into the interior of the lamp 10. The membrane 140 may be adhered to the circumference of the first communicate hole 120, and the first communicate hole 120 may be blocked by the membrane 140. The membrane 140 may be formed of a material that does not allow a water to pass through but allows a moisture (an aqueous vapor) to pass through. Accordingly, a water may be prevented from flowing from the outside of lamp 10 into the inside of lamp 10, and a moisture inside the lamp 10 may be discharged to the outside of lamp 10.

The moisture absorption cover 200 may be combined with the dust cover 100. The moisture absorption cover 200 may be combined with the dust cover 100, and the receiving space may be closed and sealed by the combination of the moisture absorption cover 200 and the dust cover 100.

The moisture absorption cover 200 may accommodate the desiccant 240, which absorbs moisture included in the air. The desiccant 240, used in the lamp 10 for the vehicle, may absorb the moisture by being solidified through a chemical reaction with moisture. The desiccant 240 may absorb moisture, and moisture absorbed by desiccant 240 may be released to the outside.

Figure 6:
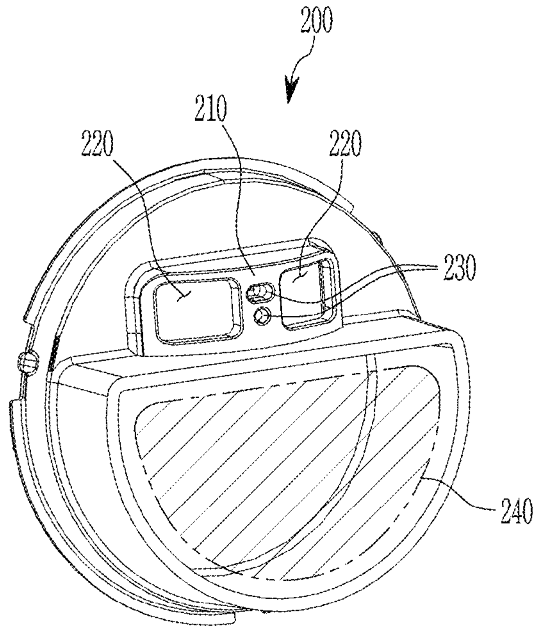
FIG. 6 is a perspective view illustrating a configuration of a moisture absorption cover of a dehumidifier according to an example embodiment of the present disclosure.

Referring to FIG. 6, the second communicate hole 220 formed in the moisture absorption cover 200 may be formed in a shape corresponding to the first communicate hole 120 formed in the dust cover 100. The second communicate hole 220 formed in the moisture absorption cover 200 may be formed in a pair.

A moisture absorption supporting bracket 210 protruding toward the dust cover 100 and having an arc-shaped cross-section may be formed on the inner surface of the moisture absorption cover 200, and a pair of second communicate holes 220 may be formed in the moisture absorption supporting bracket 210. At least one supporting groove 230 may be formed in the center of the moisture absorption supporting bracket 210. A pair of second communicate holes 220 may be formed on both sides of the supporting groove 230 of the moisture absorption supporting bracket 210. As will be described later, the supporting protrusion 130 of the dust supporting bracket 110 may be inserted into the supporting groove 230 of the moisture absorption supporting bracket 210.

The valve 300 may selectively open the first communicate hole 120 and the second communicate hole 220 by a shape memory alloy that is deformed by the temperature difference between the inside and outside of the dust cover 100 (or the change in the surrounding temperature of the valve 300). If the first communicate hole 120 is blocked by the valve 300, the second communicate hole 220 may be opened, and if the first communicate hole 120 is open, the second communicate hole 220 may be blocked. The valve 300 may be installed between the dust supporting bracket and the moisture absorption supporting bracket 210.

The valve 300 may include an opening/closing plate 310, a magnetic plate 340, and a supporting plate 320. If required, the valve 300 may further include a sealing pad 330 for the closing and sealing of the first communicate hole 120 and the second communicate hole 220.

The opening/closing plate 310 may be formed of a shape memory alloy and be transformed into a first shape and a second shape depending on a change in temperature. Depending on the modification of the opening/closing plate 310, the first communicate hole 120 and the second communicate hole 220 can be selectively opened.

The first shape can be the shape of the opening/closing plate 310 when the surrounding temperature of the opening/closing plate 310 is below a set, selected, or predetermined temperature (e.g., when the vehicle is parked), in which case the vehicle with the lamp 10 turned off may be parked. When the shape of the opening/closing plate 310 is the first shape, the first communicate hole 120 may be blocked and the second communicate hole 220 may be opened.

The second shape can be the shape of the opening/closing plate 310 when the surrounding temperature of the opening/closing plate 310 is higher than a set, selected, or predetermined temperature (e.g., when the vehicle is in motion), and for example, the vehicle with the lamp 10 turned on may be in motion. When the shape of the opening/closing plate 310 is the second shape, the first communicate hole 120 may be opened and the second communicate hole 220 may be blocked.

When the opening/closing plate 310 blocks the first communicate hole 120 or the second communicate hole 220 due to the deformation of the opening/closing plate 310, the supporting plate 320 can be attached to the magnetic plate 340 by the magnetic force of the magnetic plate 340, so that the shape and position of the opening/closing plate 310 combined with the supporting plate 320 may be maintained.

The sealing pad 330 may block the air flow through the first communicate hole 120 and/or the second communicate hole 220 by closing and sealing the first communicate hole 120 and/or the second communicate hole 220 when the opening/closing plate 310 blocks the first communicate hole 120 or the second communicate hole 220.

Figure 7:
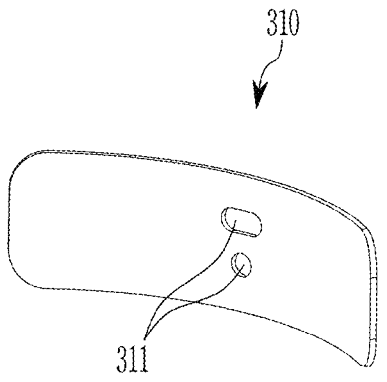
FIG. 7 is a schematic diagram showing a configuration of an opening/closing plate of a dehumidifier according to an example embodiment of the present disclosure.

Referring to FIG. 7, the opening/closing plate 310 may be formed with a shape corresponding to the first communicate hole 120 and the second communicate hole 220. That is, the opening/closing plate 310 may be formed into a thin plate shape in the shape of an arc. At least one opening/closing auxiliary supporting hole 311 can be formed in the center of the opening/closing plate 310, corresponding to the supporting protrusion 130 of the dust cover 100. As described above, depending on the change in the surrounding temperature of the opening/closing plate 310, the opening/closing plate 310 may be deformed into the first shape and the second shape.

Figure 8:
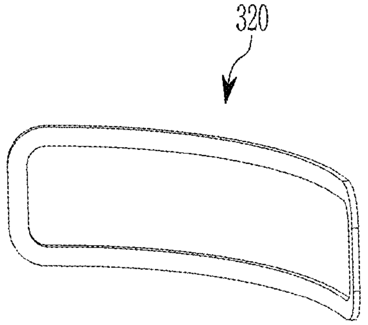
FIG. 8 is a perspective view showing a configuration of a supporting plate of a dehumidifier according to an example embodiment of the present disclosure.

Referring to FIG. 8, the supporting plate 320 may be coupled to the periphery of the opening/closing plate 310 and be deformed according to the deformation of the opening/closing plate 310. The supporting plate 320 may be formed into a shape corresponding to the outer surface of the opening/closing plate 310. The center of the supporting plate 320 may be opened to correspond to the first communicate hole 120 and/or the second communicate hole 220, and be formed into a thin plate shape. The supporting plate 320 may be formed of a metallic material and be selectively attached to the magnetic plate 340 depending on the deformation of the opening/closing plate 310. The supporting plate 320 may be formed of a thin iron sheet that may be elastically deformed and attached to the magnetic plate 340 by magnetic force.

Figure 9A:
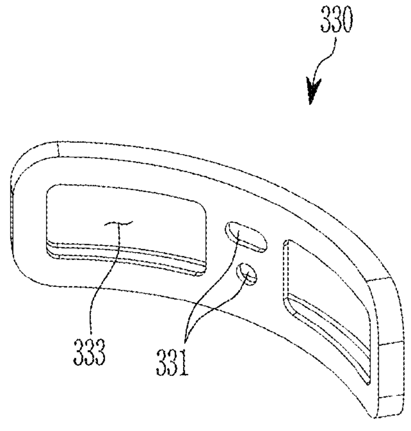
FIG. 9A is a perspective view showing a configuration of a sealing pad of a dehumidifier according to an example embodiment of the present disclosure.
Figure 9B:
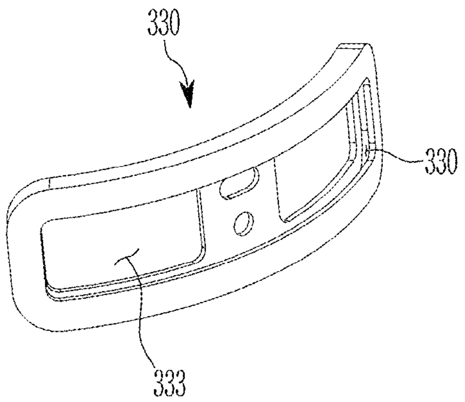
FIG. 9B is a perspective view showing a configuration of a sealing pad of a dehumidifier according to an example embodiment of the present disclosure.

Referring to FIGS. 9A and 9B, a sealing pad 330 provided on the outer periphery of the opening/closing plate 310 and the supporting plate 320 may be formed in a shape corresponding to the outer periphery of the supporting plate 320, and a sealing coupling groove 335 may be formed on the outer circumference of the sealing pad 330 so that the opening/closing plate 310 and the supporting plate 320 may be inserted.

A sealing auxiliary communicate hole 333 can be corresponding to the first communicate hole 120 and the second communicate hole 220 and may be formed in the sealing pad 330. A sealing auxiliary supporting hole 331 corresponding to the supporting protrusion 130 of the dust supporting bracket 110 may be formed in the sealing pad 330. The sealing auxiliary supporting hole 331 may be formed in the center of the sealing pad 330, and the sealing auxiliary communicate hole 333 may be formed on both sides of the sealing auxiliary supporting hole 331.

The sealing pad 330 may increase the closing and sealing force between the first communicate hole 120 and the opening/closing plate 310, and between the second communicate hole 220 and the opening/closing plate 310, when the opening/closing plate 310 blocks the first communicate hole 120 or the second communicate hole 220. Through this, the flow of the air between the first communicate hole 120 and the opening/closing plate 310, and the flow of the air between the second communicate hole 220 and the opening/closing plate 310 may be effectively blocked.

Figure 10:
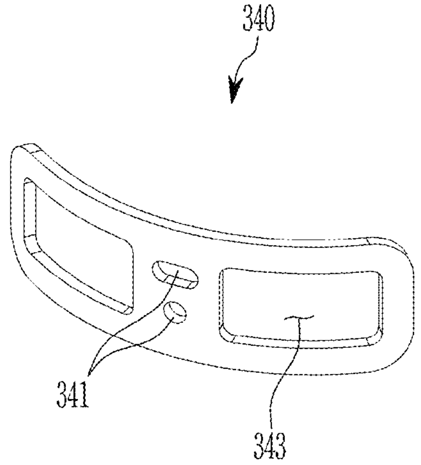
FIG. 10 is a perspective view showing a configuration of a magnetic plate of a dehumidifier according to an example embodiment of the present disclosure.

Referring to FIG. 10, the magnetic plate 340 may be formed of a magnetic material, and the magnetic plate 340 may be formed in a shape corresponding to the outer periphery of the first communicate hole 120. The magnetic plate 340 may be formed into a thin plate shape. At least one magnetic auxiliary supporting hole 341 may be formed in the center of the magnetic plate 340, corresponding to the supporting protrusion 130 of the dust supporting bracket 110. On both sides of the magnetic auxiliary supporting hole 341, a magnetic auxiliary communicate hole 343 corresponding to the first communicate hole 120 and the second communicate hole 220 may be formed.

The magnetic plate 340 may be provided in either the first communicate hole 120 of the dust supporting bracket 110 or the second communicate hole 220 of the moisture absorption supporting bracket 210, and in an embodiment, the magnetic plate 340 may be fixedly installed in the first communicate hole 120. The magnetic plate 340 may be attached to the dust supporting bracket 110 of the dust cover 100 using an adhesive, etc. Alternatively, the magnetic plate 340 may be integrally formed with the dust cover 100 through an insert injection.

The magnetic plate 340 can be selectively attached to the supporting plate 320, so that when the opening/closing plate 310 combined with the supporting plate 320 blocks the first communicate hole 120 or the second communicate hole 220, the opening/closing force of the opening/closing plate 310 may be maintained.

Referring again to FIG. 4, an assembly process of the dust cover 100, the moisture absorption cover 200, and the valve 300 will be described.

In an embodiment, the valve 300 may be placed between the dust supporting bracket 110 of the dust cover 100 and the moisture absorption supporting bracket 210 of the moisture absorption cover 200.

The magnetic plate 340 may be placed outside the first communicate hole 120 and be fixedly installed on the dust supporting bracket 110. Alternatively, the magnetic plate 340 may be integrally formed with the dust supporting bracket 110 of the dust cover 100.

The supporting plate 320 may be coupled to the outer surface of the opening/closing plate 310, and the coupled opening/closing plate 310 and supporting plate 320 may be coupled by being inserted into the sealing coupling groove 335 of the sealing pad 330. Accordingly, when the opening/closing plate 310 is deformed due to a change in temperature, the supporting plate 320 and the sealing pad 330 are also deformed according to the shape of the opening/closing plate 310.

The opening/closing auxiliary supporting hole 311 formed in the opening/closing plate 310 and the sealing supporting hole formed to the sealing pad 330 are inserted onto the supporting protrusion 130 of the dust bracket.

With the opening/closing plate 310 and the sealing pad 330 inserted onto the supporting protrusion 130 of the dust bracket, the moisture absorption cover 200 can be attached to the dust cover 100. The supporting protrusion 130 of the dust cover 100 can be inserted into the supporting groove 230 formed in the moisture absorption bracket of the moisture absorption cover 200, so that the valve 300 may be placed between the moisture absorption cover 200 and the dust cover 100.

In an embodiment, it is described as an example that the supporting protrusion 130 is formed in the dust cover 100 and the supporting groove 230 is formed in the moisture absorption cover 200, but the scopes of an embodiment are not necessarily limited thereto. The positions of the supporting protrusion 130 and the supporting groove 230 may be interchanged.

Hereinafter, the operation of the valve of the dehumidifier according to an embodiment is described in detail with reference to attached drawings.

Figure 11:
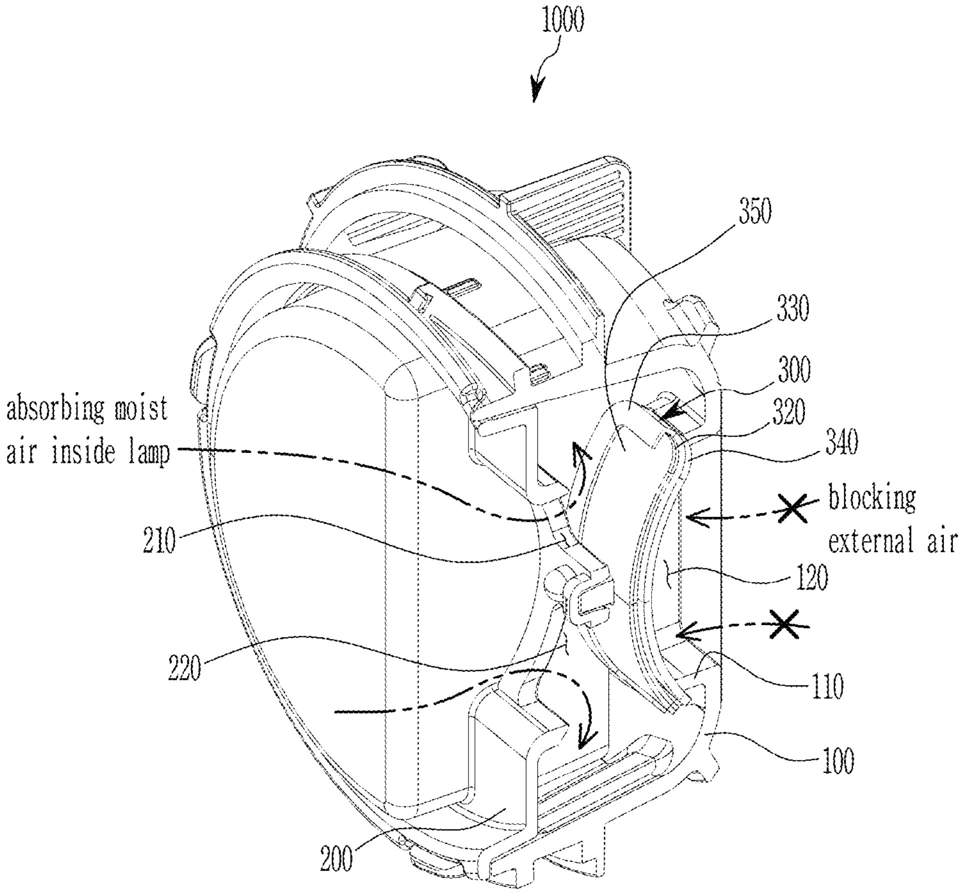
FIG. 11 and FIG. 12 are views for explaining an operation of a dehumidifier according to an example embodiment of the present disclosure.
Figure 12:
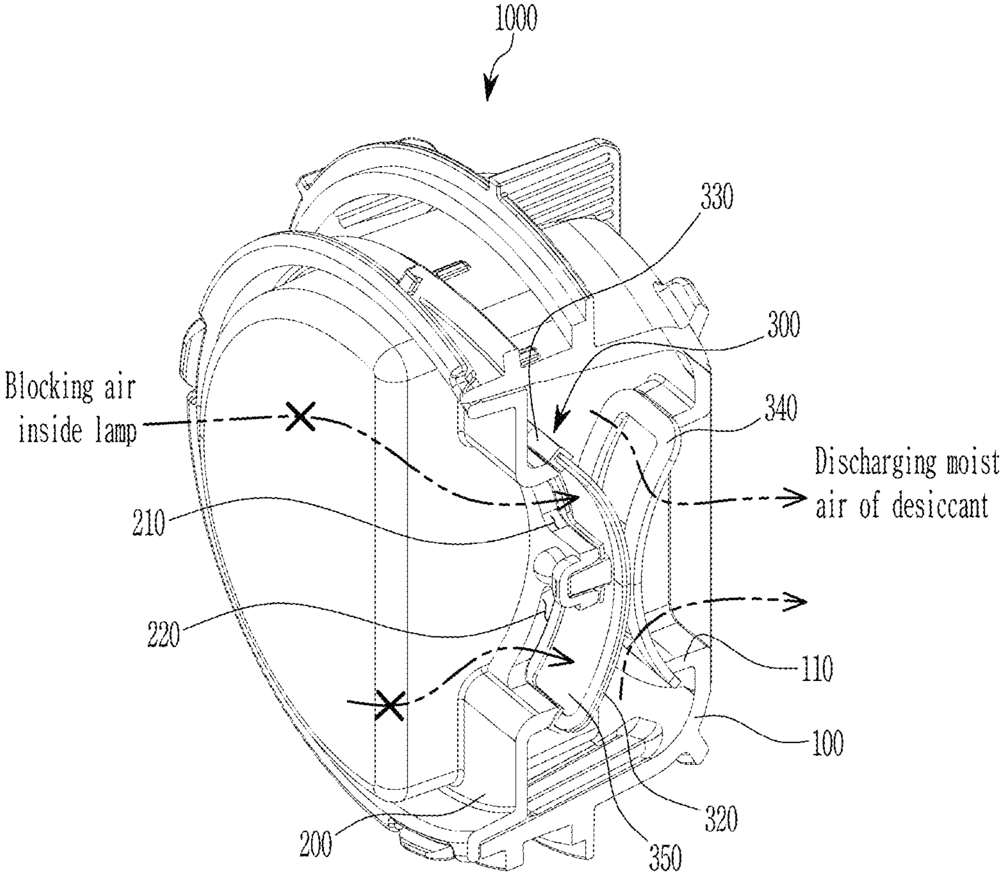

FIG. 11 and FIG. 12 are views for explaining an operation of a dehumidifier according to an embodiment of the present disclosure. FIG. 11 is a view to explain the operation of the dehumidifier when the vehicle is parked. FIG. 12 is a view to explain the operation of the dehumidifier while the vehicle is running.

First, referring to FIG. 11, when the vehicle is parked and not running, the lamp 10 of the vehicle may not turn on but may turn off. Accordingly, the surrounding temperature of the opening/closing plate 310 of the valve 300 can be lowered below a set, selected, or predetermined temperature, and the opening/closing plate 310 may be deformed into the first shape.

Accordingly, in the first shape, the opening/closing plate 310 may block the first communicate hole 120 and open the second communicate hole 220.

As the first communicate hole 120 is blocked by the opening/closing plate 310, a moist air from the outside may be blocked from flowing into the interior of lamp 10.

Also, as the second communicate hole 220 can be opened, a moist air inside the lamp 10 can inflow into the receiving space of the dust cover 100 through the second communicate hole 220 of the moisture absorption cover 200, and the moisture included in the air may be captured by the desiccant 240 accommodated in the moisture absorption cover 200.

The supporting plate 320 coupled to the outer surface of the opening/closing plate 310 can be magnetically attached to the magnetic plate 340 provided in the first communicate hole 120, so that even if a vibration or impact occurs in the vehicle, the opening/closing plate 310 may be prevented from being separated from the first communicate hole 120.

Next, referring to FIG. 12, when the vehicle is running and the lamp 10 of the vehicle is turned on, the temperature inside the lamp 10 can increase. Accordingly, the surrounding temperature of the opening/closing plate 310 of the valve 300 can increase above a set, selected, or predetermined temperature, and the opening/closing plate 310 may be deformed into the second shape.

Accordingly, in the second shape, the opening/closing plate 310 may open the first communicate hole 120 and block the second communicate hole 220.

As the first communicate hole 120 is opened by the opening/closing plate 310, the moist air of the desiccant 240 included in the moisture absorption cover 200 may be discharged to the outside through the first communicate hole 120.

Also, as the second communicate hole 220 is blocked, the air inside lamp 10 does not inflow into the receiving space of the dust cover 100.

As the air temperature inside the lamp 10 increases, the pressure inside the lamp 10 can increase, causing the opening/closing plate 310 to open the second communicate hole 220 due to the pressure. Accordingly, the moist air included in the desiccant 240 can be discharged more quickly to the outside of the dehumidifier 1000 by the pressure inside the lamp 10. That is, the high-pressure air inside the lamp 10 can flow into the receiving space between the dust cover 100 and the moisture absorption cover 200, and the high-pressure air flowing into the receiving space and the moist air of desiccant 240 may be quickly discharged through the first communicate hole 120.

According to an embodiment of the present disclosure, when the vehicle is parked, the inflow of the moist air from the outside into the interior of the dehumidifier 1000 and the lamp 10 may be prevented, thereby preventing the performance of the desiccant 240 from being deteriorated.

According to an embodiment of the present disclosure, by discharging the moist air absorbed by the desiccant 240 to the outside of the dehumidifier 1000 while the vehicle is running, the performance of the desiccant 240 may be improved.

According to an embodiment of the present disclosure, by opening/closing the communicate hole without using a separate power source, the manufacturing cost of the vehicle may be reduced and the durability of the valve 300 may be improved.

While the present disclosure has been described in connection with what is presently considered to be practical example embodiments, it can be understood that the present disclosure is not necessarily limited to the disclosed example embodiments, but, on the contrary, is intended to cover various modifications and equivalent arrangements included within the spirit and scopes of the appended claims.

What is claimed is:

1. A dehumidifier for a lamp of a vehicle, comprising:
- a dust cover configured to be coupled to a vehicle lamp housing of the lamp of the vehicle, the dust cover including a first communicate hole therein;
- a desiccant;
- a moisture absorption cover disposed in the dust cover, wherein the moisture absorption cover accommodates the desiccant, wherein the moisture absorption cover includes a second communicate hole therein, and wherein the second communicate hole corresponds to the first communicate hole;
- a valve including a shape memory alloy such that the valve is configured to selectively open the first communicate hole and the second communicate hole by the shape memory alloy being deformed by a temperature change,
- wherein the valve comprises an opening/closing plate that includes the shape memory alloy and is configured to selectively open the first communicate hole and the second communicate hole according to the temperature change, and
- wherein the valve further comprises:
  - a magnetic plate including a magnetic material and disposed at one of the first communicate hole and the second communicate hole; and
  - a supporting plate coupled to the opening/closing plate and configured to be deformed depending on to a deformation of the opening/closing plate such that the supporting plate is selectively attached to the magnetic plate.

2. The dehumidifier of claim 1, wherein the magnetic plate has a shape corresponding to a periphery of the first communicate hole and the second communicate hole.

3. The dehumidifier of claim 2, wherein the magnetic plate is fixedly installed at either the first communicate hole of the dust cover or the second communicate hole of the moisture absorption cover.

4. The dehumidifier of claim 1, wherein the supporting plate includes an iron sheet.

5. The dehumidifier of claim 4, wherein the supporting plate includes a central opening and has a shape corresponding to an outer periphery of the opening/closing plate.

6. The dehumidifier of claim 1, further comprising a membrane disposed at the first communicate hole and configured to prevent moisture outside the dust cover from flowing into the lamp.

7. The dehumidifier of claim 1, further comprising a sealing pad disposed on an outside of the supporting plate.

8. The dehumidifier of claim 1, further comprising a gasket disposed between the dust cover and the moisture absorption cover.

9. The dehumidifier of claim 1, wherein, based on a surrounding temperature of the valve being below a first temperature, the opening/closing plate of the valve is configured to be deformed in a first shape such that the opening/closing plate blocks the first communicate hole and opens the second communicate hole.

10. The dehumidifier of claim 9, wherein, based on the surrounding temperature of the valve being higher than the first temperature, the opening/closing plate of the valve is configured to be deformed into a second shape such that the opening/closing plate opens the first communicate hole and blocks the second communicate hole.

11. A dehumidifier of a lamp for a vehicle comprising:
- a dust cover configured to be coupled to a vehicle lamp housing of the lamp of the vehicle, the dust cover comprising a dust supporting bracket having a first cross-section in a first arc shape, and having a first communicate hole through the dust supporting bracket;
- a moisture absorption cover comprising a moisture absorption supporting bracket having a second cross-section in a second arc shape, and having a second communicate hole through the moisture absorption supporting bracket, wherein the second communicate hole at least partially aligns with the first communicate hole; and
- a valve disposed between the dust supporting bracket and the moisture absorption supporting bracket, wherein the valve includes a shape memory alloy, and wherein the valve is configured to selectively open the first communicate hole and the second communicate hole by the shape memory alloy being deformed by a temperature change,
- wherein the valve comprises:
  - an opening/closing plate including the shape memory alloy and configured to selectively open the first communicate hole and the second communicate hole according to the temperature change;
  - a magnetic plate including a magnetic material and disposed at one of the first communicate hole and the second communicate hole;
  - a supporting plate coupled to the opening/closing plate and configured to be deformed according to a deformation of the opening/closing plate such that the supporting plate is selectively attached to the magnetic plate; and
  - a sealing pad disposed on an outside of the supporting plate.

12. The dehumidifier of claim 11, further comprising: a supporting protrusion on one of the dust cover or the moisture absorption cover; and a supporting groove on another of the dust cover or the moisture absorption cover and configured to be fixedly engaged to the supporting protrusion being inserted therein.

13. The dehumidifier of claim 12, wherein the opening/closing plate has an opening/closing auxiliary supporting hole positioned corresponding to the supporting protrusion, and
- wherein the sealing pad has a sealing auxiliary supporting hole positioned corresponding to the supporting protrusion.

14. The dehumidifier of claim 11, wherein, based on a surrounding temperature of the valve being below a first temperature, the opening/closing plate of the valve is configured to be deformed in a first shape such that the opening/closing plate blocks the first communicate hole and opens the second communicate hole.

15. The dehumidifier of claim 14, wherein, based on the surrounding temperature of the valve being higher than the first temperature, the opening/closing plate of the valve is configured to be deformed into a second shape such that the opening/closing plate opens the first communicate hole and blocks the second communicate hole.

16. The dehumidifier of claim 11, further comprising a membrane disposed at the first communicate hole and configured to prevent moisture outside the dust cover from flowing into the lamp.

17. A lamp for a vehicle comprising:

a lamp housing;

a light source module within the lamp housing; and a dehumidifier attached to the lamp housing, wherein the dehumidifier comprises:

a dust cover including a first communicate hole therein;

a desiccant;

a moisture absorption cover disposed in the dust cover, wherein the moisture absorption cover accommodates the desiccant, wherein the moisture absorption cover includes a second communicate hole therein, and wherein the second communicate hole corresponds to the first communicate hole; and a valve including a shape memory alloy such that the valve is configured to selectively open the first communicate hole and the second communicate hole by the shape memory alloy being deformed by a temperature change, wherein the valve comprises an opening/closing plate that includes the shape memory alloy and is configured to selectively open the first communicate hole and the second communicate hole according to the temperature change, and wherein the valve further comprises:

a magnetic plate including a magnetic material and disposed at one of the first communicate hole and the second communicate hole; and a supporting plate coupled to the opening/closing plate and configured to be deformed depending on to a deformation of the opening/closing plate such that the supporting plate is selectively attached to the magnetic plate.

* * * * *